US005089337A

United States Patent [19]

Hochfeld

[11] Patent Number: 5,089,337

[45] Date of Patent: Feb. 18, 1992

[54] BUSINESS CARD SECURING DEVICE

[75] Inventor: Stanley Hochfeld, Howard Beach, N.Y.

[73] Assignees: Leonard Holtz, Oceanside; Charles Mutterperl, Valley Stream, both of N.Y.

[21] Appl. No.: 436,260

[22] Filed: Nov. 13, 1989

[51] Int. Cl.[5] .......... B32B 7/12; G09F 3/20; G09F 1/10

[52] U.S. Cl. .......... 428/352; 40/642; 40/649

[58] Field of Search .......... 40/642, 649, 650; 428/343, 352, 40, 136

[56] References Cited

U.S. PATENT DOCUMENTS

| | | | |
|---|---|---|---|
| 1,972,263 | 9/1934 | Hansen | 40/649 X |
| 2,110,768 | 3/1938 | Kellogg | 40/642 |
| 2,570,708 | 10/1951 | Pitcher | 40/649 X |
| 2,920,407 | 1/1960 | Stathem | 40/642 |
| 3,125,460 | 3/1964 | Rose | 428/343 X |
| 3,350,045 | 10/1967 | Mayers | 428/14 |
| 3,562,937 | 2/1971 | Sandel | 40/642 |
| 3,680,768 | 8/1972 | Warren | 40/649 X |
| 3,698,111 | 10/1972 | Smith | 40/642 |
| 4,016,664 | 4/1977 | Kaufmann | 40/642 |
| 4,268,000 | 5/1981 | Ulm | 428/343 X |
| 4,450,955 | 5/1984 | Featherston | 40/649 X |

*Primary Examiner*—George F. Lesmes
*Assistant Examiner*—D. R. Zirker
*Attorney, Agent, or Firm*—Frishauf, Holtz, Goodman & Woodward

[57] ABSTRACT

A device for removably securing a card to a surface includes a rectangular elongated strip having a front surface and a rear surface; triangular corner pockets formed at opposite ends of said strip for removably securing opposite corners of a rectangular business card to the strip; and an adhesive on the rear surface of the strip for removably adhering the strip to the surface.

6 Claims, 3 Drawing Sheets

BUSINESS CARD SECURING DEVICE

BACKGROUND OF THE INVENTION

This invention relates generally to business cards, and more particularly, to a device for removably securing a business card to a surface, such as to a piece of paper, cardboard, booklet, pamphlet, and the like.

It is often desirable to removably secure a business card to a piece of paper, such as a letter, brochure or the like such that the business card can be removed and separately stored or indexed. This has conventionally been performed by the use of staples, paper clips, tape, slits in the paper, or the like. However, all of these methods are crude and sloppy when removing the business card on the receiving end, and also generally mutilate the business card and/or underlying surface or paper. Providing slits for mounting a card is time consuming, costly and damages the underlying paper. These methods of securing the business card to the paper may also discourage the recipient from properly filing the card so that the card may ultimately be disposed of along with the underlying paper. Throughout this specification the invention will be described for mounting a card to a paper surface. It should be clear that "paper surface" is being used for convenience, and that other surfaces, whether or not of paper, are included in the scope of the invention as defined in the appended claims.

OBJECTS AND SUMMARY OF THE INVENTION

Accordingly, it is an object of the present invention to provide a device for securing a business card to a surface that overcomes the aforementioned problems with the prior art.

It is another object of the present invention to provide a device for removably securing a business card to a paper which does not mutilate the business card or the paper.

It is still another object of the present invention to provide a device for securing a business card to paper that is aesthetically pleasing.

It is yet another object of the present invention to provide a device for securing a business card to paper which has a second function of containing a message thereon separate from the business card.

It is a further object of the present invention to provide a device for removably securing a business card to paper that is easy and economical to manufacture and use.

In accordance with an aspect of the present invention, a device for removably securing a card to a surface includes an elongated strip having a front surface and a rear surface; securing means for removably securing different peripheral portions of the card to the strip, the securing means being formed at at least two positions of the strip at the front surface thereof; and adhesive means for removably adhering the strip to the surface.

The above and other objects, features and advantages of the present invention will become readily apparent from the following detailed description thereof which is to be read in connection with the accompanying drawings.

DETAILED DESCRIPTION OF THE PREFERRED EMBODIMENTS

Figure 1:
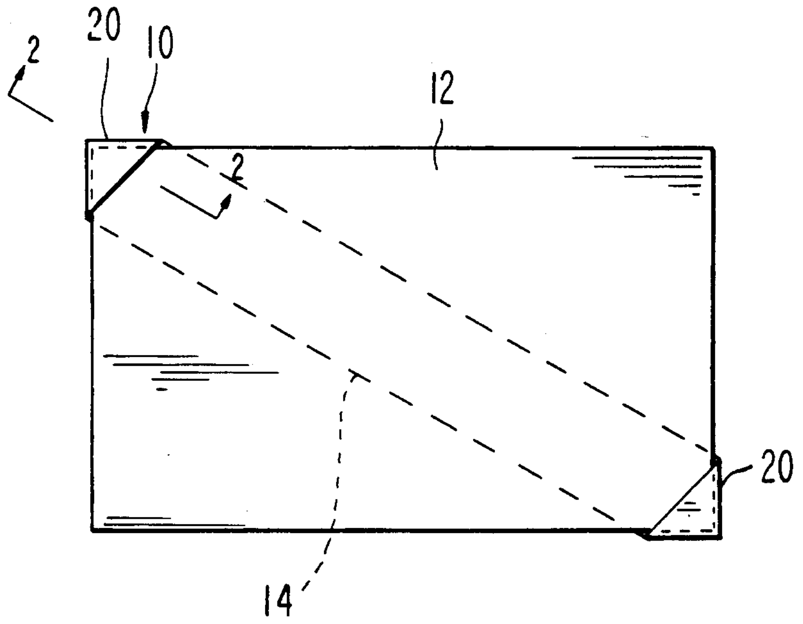
FIG. 1 is a top plan view of a device for removably securing a business card to a surface, according to one embodiment of the present invention, with a business card secured therein.
Figure 2:
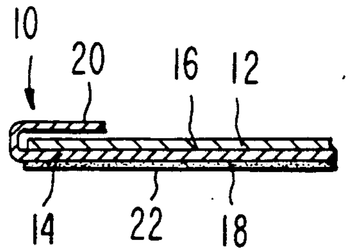
FIG. 2 is a cross-sectional view of the device of FIG. 1, taken along line 2—2 thereof.

Referring to the drawings in detail, and initially to FIGS. 1 and 2 thereof, a device 10 for removably securing a business card 12 to a surface, such as a piece of paper, a booklet, a book, a wall or the like, generally includes a substantially rectangular elongated strip 14 having a front surface 16 and a rear surface 18. Corner pockets 20 are formed at opposite ends of strip 14, either integrally therewith or secured thereto, and form securing means for removably securing opposite corners of business card 12 to strip 14. In the preferred embodiment of FIG. 1, corner pockets 20 have a generally triangular configuration so as to snugly receive the opposite corners of business card 12.

An adhesive 22 is coated on rear surface 18 of strip 14 so as to removably adhere strip 14 to a surface such as a piece of paper or the like. A suitable adhesive that can be used is of the "removable" type found on POST-IT® note pads sold by 3M Commercial Office Supply Division, 3M Center, St. Paul, Minn. 55144.

Accordingly, device 10 can be removably secured to a surface such as a piece of paper without mutilating the same, and business card 12 can be removably secured within corner pockets 20 thereof. Further, front surface 16 of elongated strip 14 can have a message (such as an advertising or promotional or inspirational message) imprinted thereon, as best shown in the embodiment of FIG. 4.

Figure 3:
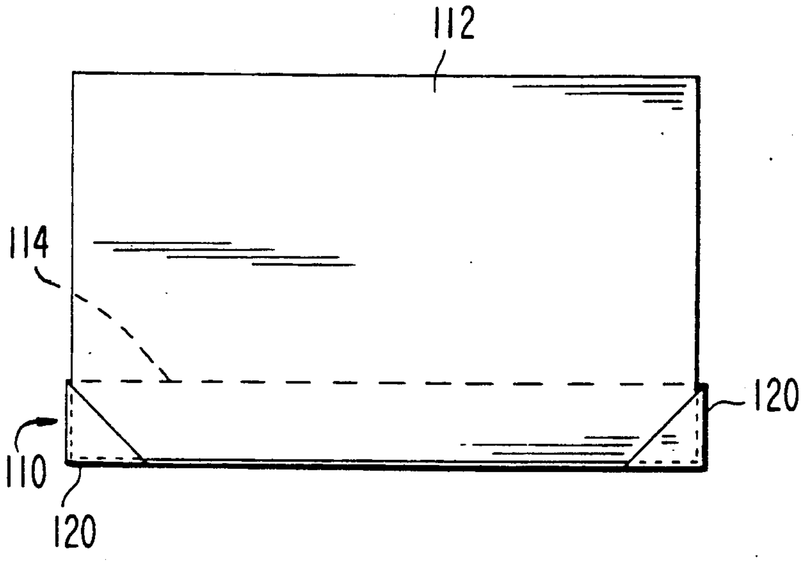
FIG. 3 is a top plan view of a device for removably securing a business card to a surface, according to another embodiment of the present invention, with a business card secured therein.
Figure 4:
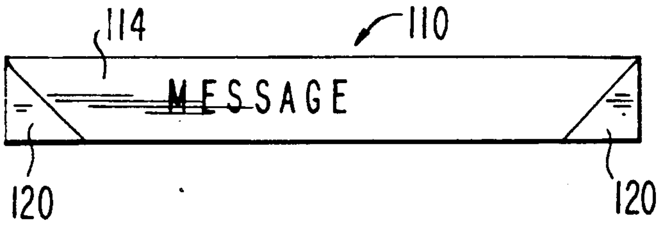
FIG. 4 is a top plan view of the device of FIG. 3, without the business card therein.

Referring now to FIGS. 3 and 4, a device 110 for removably securing a business card 112 to a surface will now be described, in which elements corresponding to those identified with respect to device 10 are identified by the same reference numerals augmented by 100, and a detailed description of the common elements will be omitted herein for the sake of brevity.

Device 110 is substantially identical to device 10 with the exception that corner pockets 120 are arranged to secure adjacent corners of business card 12 therein. In this regard, the hypotenuse of each triangular corner pocket 120 is arranged at a substantially 45° angle with respect to the lengthwise direction of elongated strip 114, as opposed to the transverse or substantially 90° angulation of corner pockets 20 with respect to elongated strip 14 of device 10.

Figure 5:
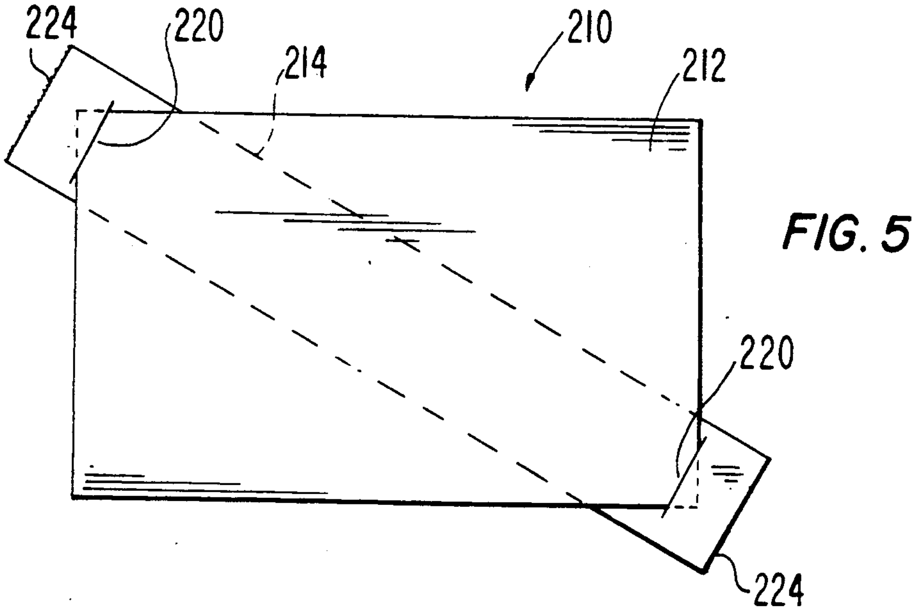
FIG. 5 is a top plan view of a device for removably securing a business card to a surface, according to another embodiment of the present invention.

Referring now to FIG. 5, there is shown a device 210 according to another embodiment of the present invention in which elements corresponding to those identified with respect to device 10 are identified by the same reference numerals augmented by 200, and a detailed description of the common elements thereof will be omitted herein for the sake of brevity.

As shown in FIG. 5, the securing means of strip 214 is formed by slits 220 adjacent to and spaced from opposite edges 224 thereof, with slits 220 being arranged generally transverse to the lengthwise direction of elongated strip 214. In this manner, the opposite corners of business card 212 are inserted through slits 220. In such case, it is advisable that the opposite ends of elongated strip 214 which extend outwardly from slits 220 do not contain an adhesive thereon, but rather, such adhesive is only provided at the rear surface of elongated strip 214 between slits 220 so as not to hinder the insertion of the opposite corners of business card 212 through slits 220.

Figure 7:
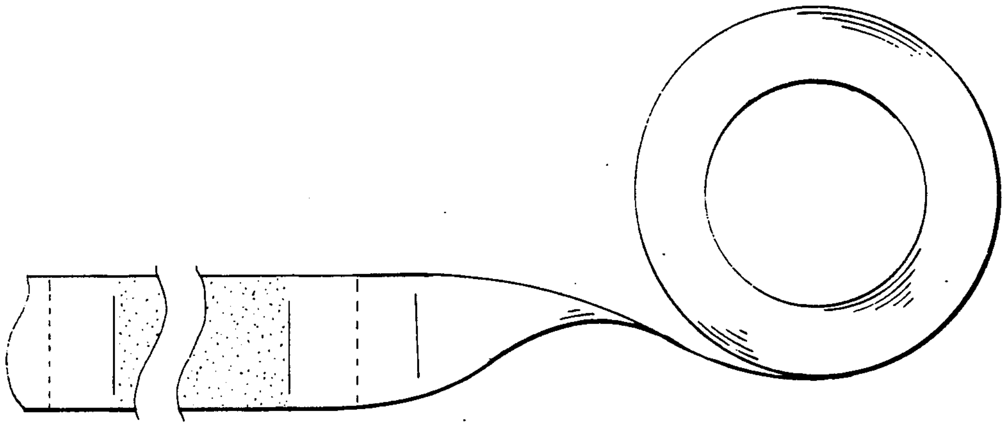
FIG. 7 shows the device of FIG. 5 supplied in a roll.

It will be appreciated that device 210 is of a much simpler form than device 10 and can be provided in a rolled-up manner (such as like conventional rolls of adhesive tape), with perforations being provided at opposite edges 224 to provide for removal of specific length segments of elongated strip 214. Such a roll in shown in FIG. 7.

Figure 6:
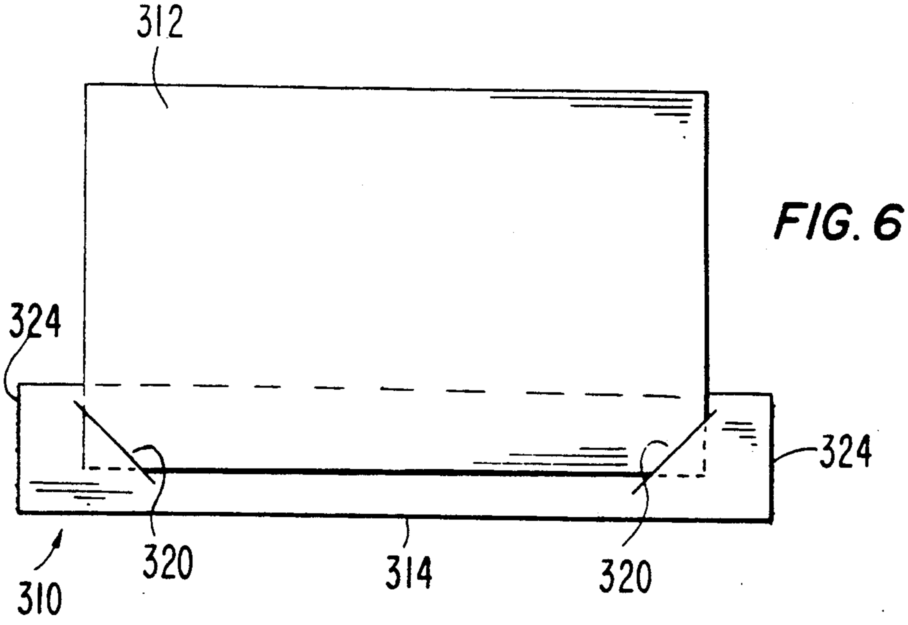
FIG. 6 is a top plan view of a device for removably securing a business card to a surface, according to another embodiment of the present invention.

Referring now to FIG. 6, a device 310 according to another embodiment of the present invention will now be described in which elements corresponding to those described above with respect to device 210 are identified by the same reference numerals augmented by 100, and a detailed description of the common elements thereof will be omitted herein for the sake of brevity.

Device 310 of FIG. 6 is identical to device 210 with the exception that the angulation of slits 320 is at a substantially 45° angle with respect to the lengthwise direction of elongated strip 314 and with the angulation of the two strips 320 on each device 310 being opposite to each other. Accordingly, adjacent corners of business card 312 are inserted within slits 320 for removable securement therein. The adhesive on the rear surface of device 310 is also preferably provided only between slits 320 and not on the extreme end portions outboard of the slits 320. Device 310 can also be provided in rolls with perforations between sections thereof (i.e. at edges 324), similar to the roll shown in FIG. 7.

Although the present invention has been described with respect to business cards, it will be appreciated that the invention can be used with any other suitable cards of different shapes, for example, circular, triangular or the like, as long as at least two different peripheral portions of the card are removably secured by the device. In addition, although the present invention has been described with respect to securement of the device to a piece of paper, the device can be secured to any flat, rounded or other irregular surface. Also, the device can be clear or opaque, or could be made in any variety of colors, as desired.

If permanent adhesion to a surface is desired, then the removable type of adhesive on the back of the above-described devices can be replaced with a more permanent type of adhesive such as is presently used on conventional transparent tapers or the like. Permanent adhesion may be desired when the "message" is desired to be permanently displayed on the mounting surface even after removal of the card.

More than one strip of the present invention can be used to mount a card or the like to a surface. For example, two strips of FIGS. 3 or 6 can be used together, one engaging upper corners of the card and the other engaging lower corners of the card. Alternatively, a wide strip having more than two pockets or slits could be provided to engage more than two corners of a card or the like. If the card or the like is odd-shaped (such as a triangle or other form), the mounting device can take a suitable shape and the pockets or slits can be suitably arranged thereon to engage and hold such odd shaped card.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined by the appended claims.

What is claimed is:

1. A device for removably securing a card-like object to a paper mounting surface, comprising:

an elongated strip having a front surface and a rear surface, said elongated strip having a substantially rectangular configuration with two ends which are opposite each other and with two sides;

securing means for removably securing different peripheral corner portions of said card-like object to said strip, said securing means being formed at at least two spaced apart positions of said strip at at least said front surface of said strip, said securing means being arranged at opposite ends of said elongated strip; and an adhesive on said rear surface of said strip to adhere said strip to the mounting surface, said adhesive having release characteristics so that said strip is removably adhered to the mounting surface and can be removed from the mounting surface without damaging the mounting surface;

said securing means including a first pocket formed at one end of said elongated strip and a second pocket formed at an opposite end of said elongated strip, each pocket being adapted to removably receive a corner portion of a card; and wherein each said pocket has a substantially triangular configuration with a hypotenuse extending substantially in a widthwise direction of said elongated strip.

2. A device according to claim 1, wherein said hypotenuse of each pocket extends substantially transverse to a lengthwise direction of said strip.

3. A device according to claim 1, wherein said hypotenuse of each pocket extends at an angle of approximately 45° with respect to a lengthwise direction of said strip.

4. A device for removably securing a card-like object to a paper mounting surface, comprising:

an elongated strip having a front surface and a rear surface, said elongated strip having a substantially rectangular configuration with two ends which are opposite each other and with two sides;

securing means for removably securing different peripheral corner portions of said card-like object to said strip, said securing means being formed at at least two spaced apart positions of said strip at at least said front surface of said strip, said securing means being arranged at opposite ends of said elongated strip; and an adhesive on said rear surface of said strip to adhere said strip to the mounting surface, said adhesive having release characteristics so that said strip is removably adhered to the mounting surface and can be removed from the mounting surface without damaging the mounting surface;

said securing means including a first slit provided at one end of said elongated strip and a second slit provided at an opposite end of said elongated strip, each slit being arranged to removably receive a corner portion of a card; and wherein each said slit extends substantially in a widthwise direction of said elongated strip.

5. A device according to claim 4, wherein each said slit extends substantially transverse to a lengthwise direction of said strip.

6. A device according to claim 4, wherein each said slit extends at an angle of approximately 45° with respect to a lengthwise direction of said strip.

* * * * *